United States Patent
Li et al.

(10) Patent No.: US 10,515,032 B2
(45) Date of Patent: Dec. 24, 2019

(54) ASYMMETRIC TRANSMISSION (TX) AND RECEIVE (RX) LANES IN A POINT-TO-POINT INTERCONNECT USING A PERIPHERAL COMPONENT INTERCONNECT EXPRESS (PCIE) RESOURCES IN A COMPUTER SYSTEM

(71) Applicant: Intel Corporation, Santa Clara, CA (US)

(72) Inventors: Zhiming Li, Shanghai (CN); Xingping Ruan, Shanghai (CN); Xiao Hu, Shanghai (CN); Terrence Trausch, Portland, OR (US); Robert Pebly, Beaverton, OR (US); Xiang Zhou, Shanghai (CN); Jie Yan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/099,958

(22) PCT Filed: Jul. 1, 2016

(86) PCT No.: PCT/CN2016/088084
§ 371 (c)(1),
(2) Date: Nov. 8, 2018

(87) PCT Pub. No.: WO2018/000406
PCT Pub. Date: Jan. 4, 2018

(65) Prior Publication Data
US 2019/0138470 A1 May 9, 2019

(51) Int. Cl.
*G06F 13/20* (2006.01)
*G06F 13/14* (2006.01)
(Continued)

(52) U.S. Cl.
CPC .............. *G06F 13/20* (2013.01); *G06F 13/14* (2013.01); *G06F 13/4022* (2013.01); *G06F 13/4282* (2013.01); *G06F 2213/0026* (2013.01)

(58) Field of Classification Search
CPC ....................................................... G06F 13/20
See application file for complete search history.

(56) References Cited

U.S. PATENT DOCUMENTS 9,159,419 B2 * 10/2015 Nellans ............... G06F 12/0246
9,720,838 B2 * 8/2017 Das Sharma ......... G06F 12/084
(Continued)

FOREIGN PATENT DOCUMENTS

CN     101316141 A     12/2008
CN     102281557 A     12/2011
(Continued)

OTHER PUBLICATIONS

PCT International Preliminary Reporting on Patentability in PCT International Application Serial No. PCT/CN2016/088084 dated Jan. 1, 2019 (5 pages).

(Continued)

*Primary Examiner* — Tammara R Peyton
(74) *Attorney, Agent, or Firm* — Alliance IP, LLC

(57) ABSTRACT

A system includes a host processor (105) and a peripheral device (708). The host processor (105) is coupled to the peripheral device (708) by a Peripheral Component Interconnect Express (PCIe) compliant link. The peripheral device (708) can include logic circuitry to identify, based on an application using the device and the host processor (105), a read to write ratio utilized by the application; and provide the read to write ratio to the host processor (105). The host processor (105) comprising logic circuitry to send a command signal to a device in communication with the hardware processor across a peripheral component interconnect express (PCIe) compliant link, the command signal indicating a transmission (TX) lane to receive (RX) lane ratio, the TX lane to RX lane ratio corresponding to the read to write ratio identified by the peripheral device (708); and receive (Continued)

an indication that the device is capable of supporting asymmetric TX and RX ratios.

22 Claims, 17 Drawing Sheets

(51) Int. Cl.
    *G06F 13/40*     (2006.01)
    *G06F 13/42*     (2006.01)

(56) References Cited

U.S. PATENT DOCUMENTS

| | | | |
|---|---|---|---|
| 9,940,287 B2 * | 4/2018 | Das Sharma | G06F 13/1663 |
| 2015/0043464 A1 | 2/2015 | Lu et al. | |

FOREIGN PATENT DOCUMENTS

| | | |
|---|---|---|
| CN | 103262061 A | 8/2013 |
| CN | 103827841 A | 5/2014 |

OTHER PUBLICATIONS

International Search Report and Written Opinion of the International Searching Authority for PCT/CN2016/088084, dated Apr. 11, 2017, 9 pages.

\* cited by examiner

1110

```
┌─────────────────────────────────────────┐
│ Host sends command to device through lane 0 │  1152
│       indicating read/write ratio          │
└─────────────────────────────────────────┘
                    │
                    ▼
┌─────────────────────────────────────────┐
│ Host and device adjust settings to ensure TX/RX are │  1154
│         redirected to match ratio          │
└─────────────────────────────────────────┘
                    │
                    ▼
┌─────────────────────────────────────────┐
│ Host (or device) transmits test data pattern on lane │  1156
│            0 to device (or host)           │
└─────────────────────────────────────────┘
                    │
                    ▼
┌─────────────────────────────────────────┐
│ Host (or device) transmits same test data pattern │  1158
│             on all active lanes           │
└─────────────────────────────────────────┘
                    │
                    ▼
┌─────────────────────────────────────────┐
│ Device (or host) verifies two test data patterns are │  1160
│         received and are the same         │
└─────────────────────────────────────────┘
```

FIG. 11B

ASYMMETRIC TRANSMISSION (TX) AND RECEIVE (RX) LANES IN A POINT-TO-POINT INTERCONNECT USING A PERIPHERAL COMPONENT INTERCONNECT EXPRESS (PCIE) RESOURCES IN A COMPUTER SYSTEM

CROSS-REFERENCE TO RELATED APPLICATIONS

This application is a national stage application under 35 U.S.C. § 371 of PCT International Application Serial No. PCT/CN2016/88084, filed on Jul. 1, 2016, and entitled ASYMMETRIC LANES IN A POINT-TO-POINT INTERCONNECT. The disclosure of the prior application is considered part of and is hereby incorporated by reference in its entirety in the disclosure of this application.

FIELD

This disclosure pertains to computing systems, and in particular, to asymmetric PCIe lanes.

BACKGROUND

The Peripheral Component Interconnect Express (PCIe)™ interface protocol a standard across the computer industry for a high-speed data communication link. The performance of some PCIe devices can be constrained by form factor (e.g., the number of transmit vs receive lanes).

PCI Express (PCIe) is a protocol that describes buses for high speed interconnection between a host device (e.g., a CPU) and an I/O device (aka, a peripheral device, e.g., a solid state memory). Although PCIe has evolved from Gen1 (2.5 Gbps) to Gen3 (8 Gbps), the need for more bandwidth remains. The higher bandwidth requires more PCIe lanes, resulting in higher signal count connectors and cables which is more expensive. In applications where there is mechanical constraint of maximum signal count, the PCIe lane count is limited, and bandwidth is capped.

BRIEF DESCRIPTION OF THE DRAWINGS

FIGS. 11A-B are process flow diagrams for link training in accordance with embodiments of the present disclosure.

Like reference numbers and designations in the various drawings indicate like elements.

DETAILED DESCRIPTION

Figure 1:
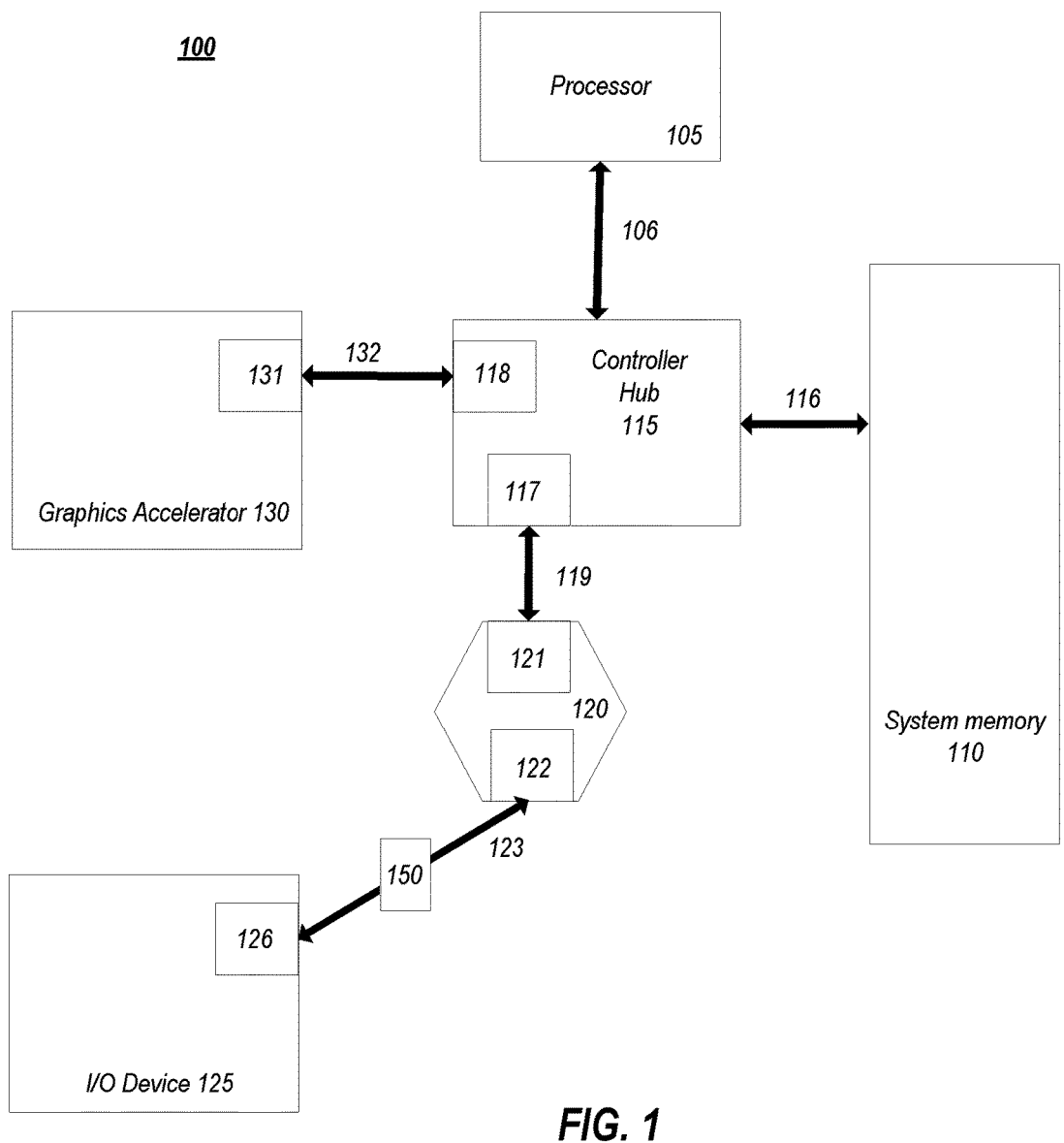
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
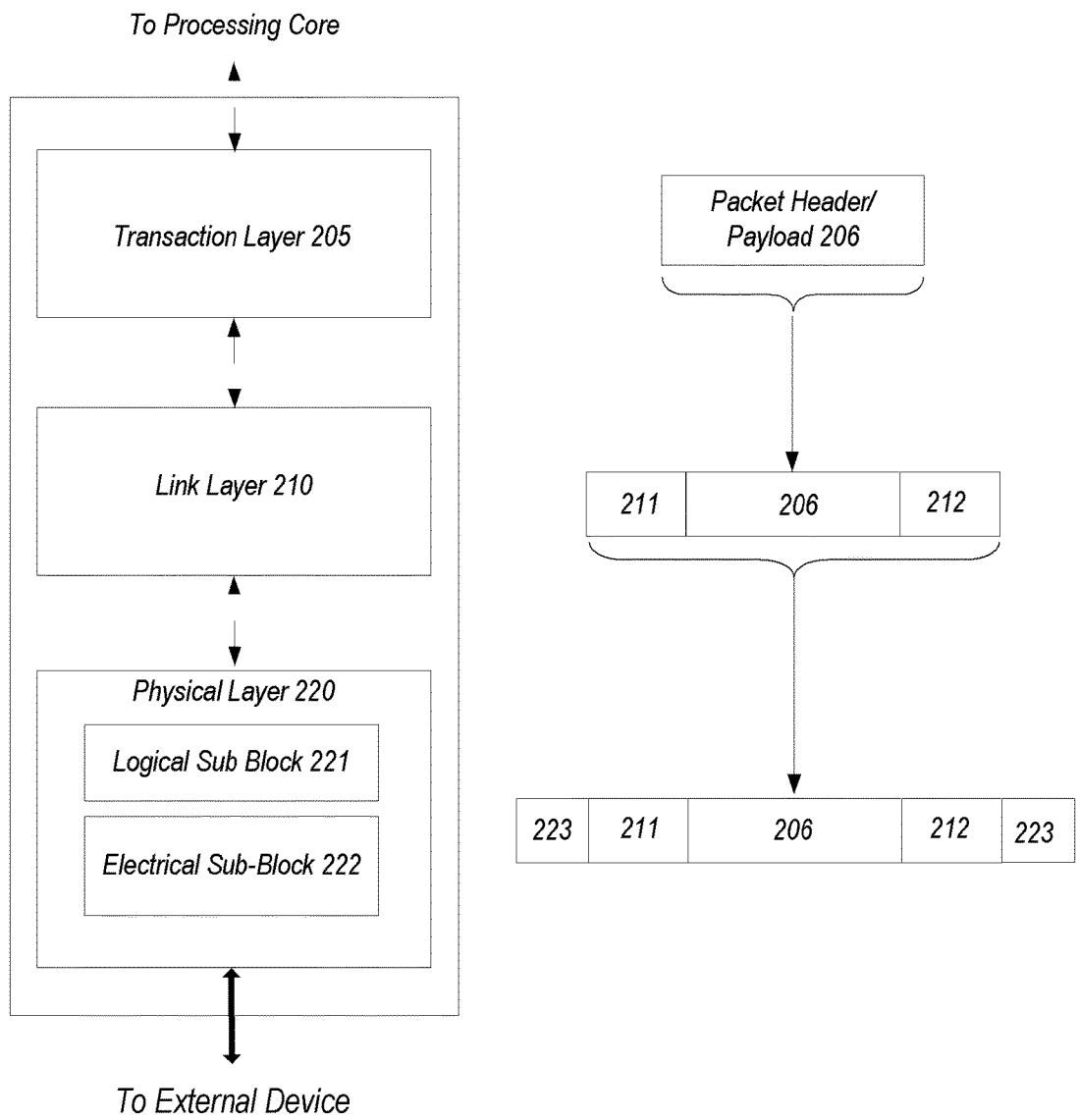
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
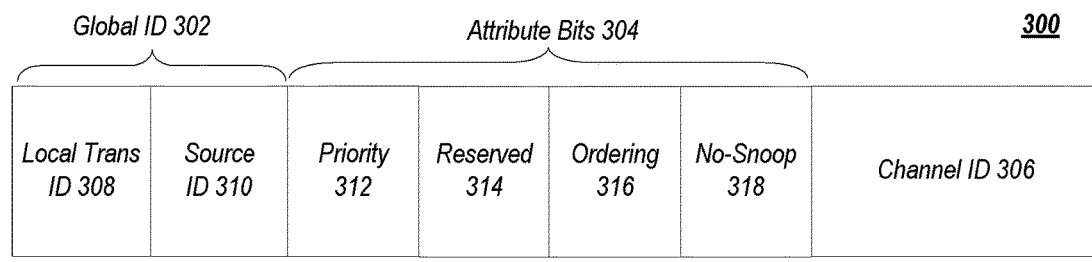
FIG. 3 illustrates an embodiment of a request or packet to be generated or received within an interconnect architecture.

Referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
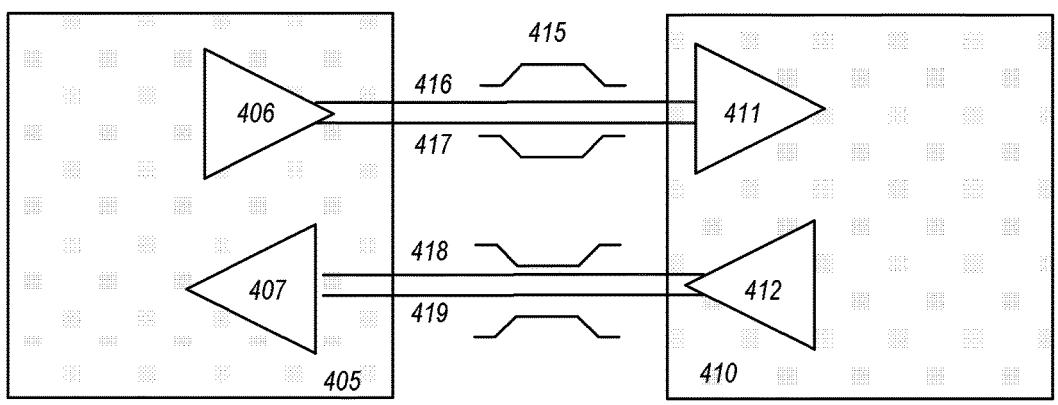
FIG. 4 illustrates an embodiment of a transmitter and receiver pair for an interconnect architecture.
Figure 5:
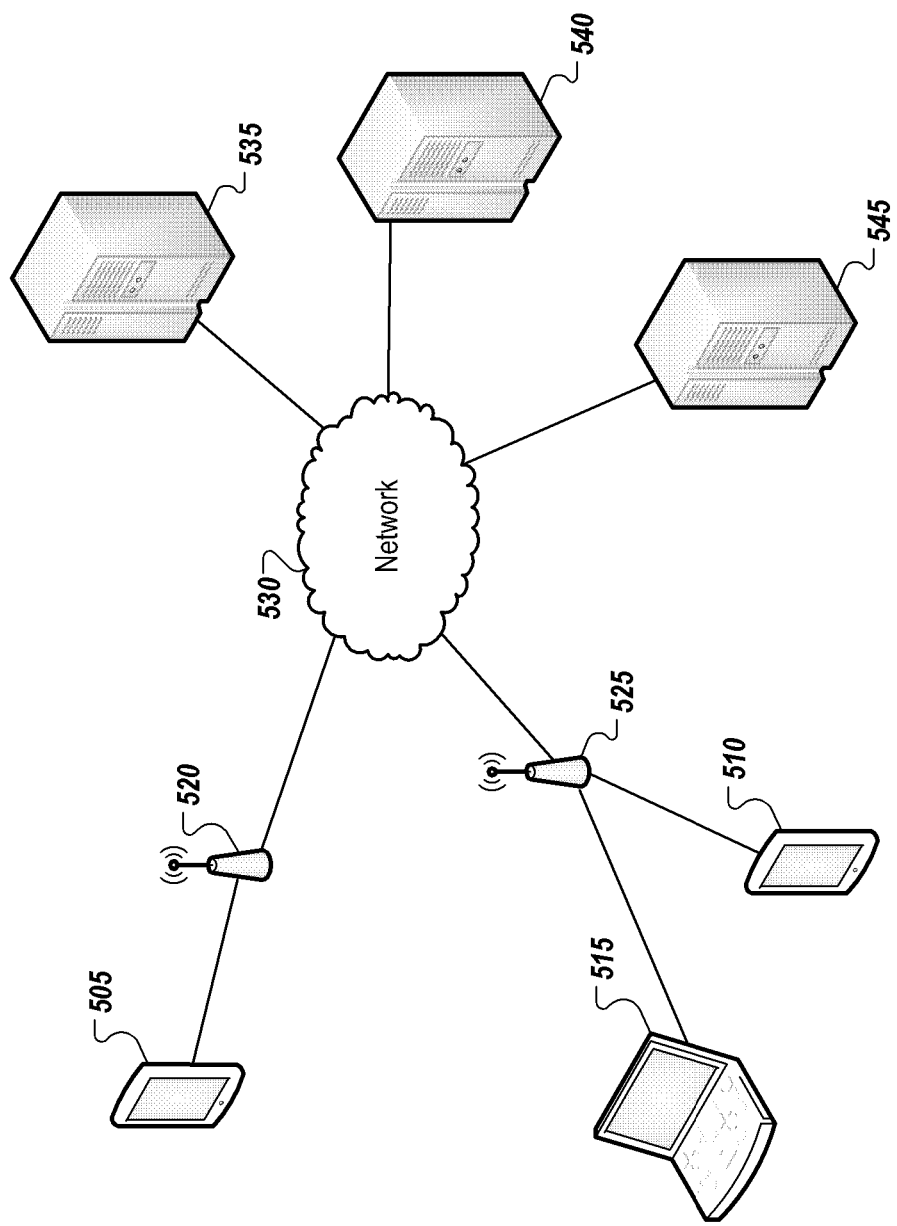
FIG. 5 illustrates an example system including host devices coupled to one or more data networks.
Figure 6:
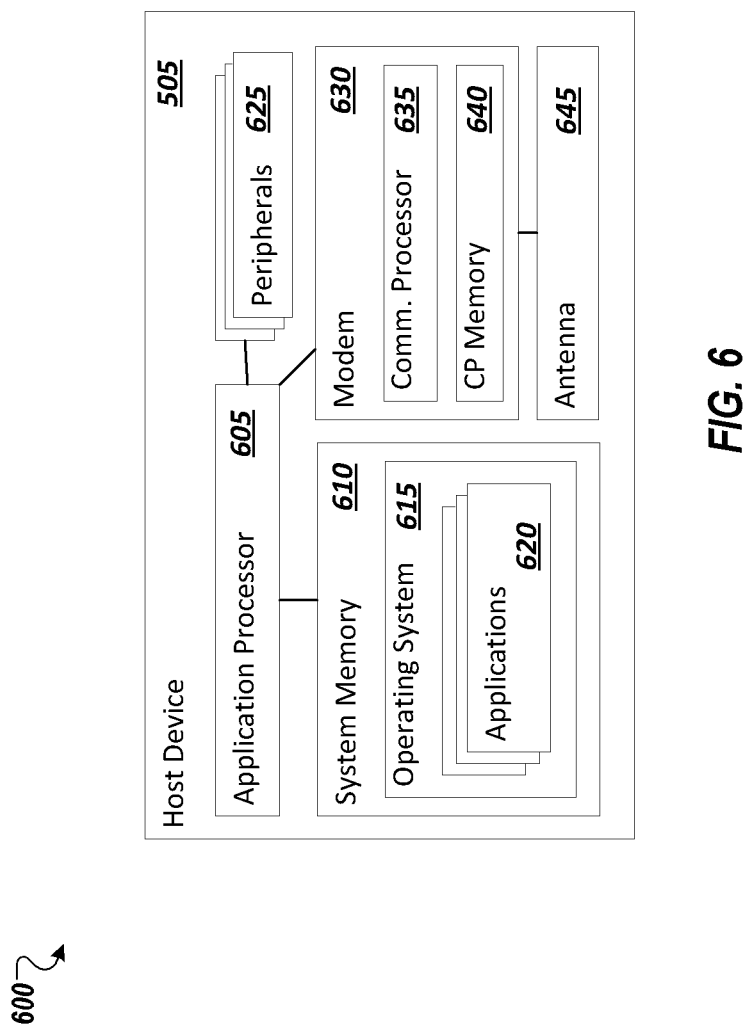
FIG. 6 is a block diagram of an example host device.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

As mentioned previously, the performance of some PCIe devices can be constrained by form factor (e.g., the number of transmit vs receive lanes). Increasing either the PCIe bus transfer rate or the connector density can have significant impacts to the ecosystem This disclosure addresses the gap between the increased data throughput from peripheral devices (e.g., NVMe SSD memory or other device) connected via PCIe to host devices and the limited PCIe signal count (e.g., PCIe x4 SFF-8639 interface).

This invention is to maximize the utilization of the existing SFF-8639 PCIe x4 interface, i.e. to almost achieve x8 performance, by taking advantage of the asymmetric Read/Write access patterns that the majority of workloads behave on NVMe SSDs.

In current PCIe specification, the same number of TX and RX pairs are allocated in each PCIe lane. For example, there are 4 TX and RX pairs in SFF-8639 PCIe SSD interface specification. However, many workloads are not balanced on Read and Write performance. For example, many data analytic workloads are read-intensive, in which case the TX's (from CPU point of view) are less utilized.

Put succinctly, if the Read/Write ratio is M/N, then Tx/Rx ratio should be M/N, too, to achieve an optimized pin utilization. Therefore, the interface would only need to be of (M+N) width, rather than the original 2*max(M, N). This disclosure describes facilitating different TX and RX pairs in PCIe links to match the workload's Read/Write pattern. To achieve the goal, a new Physical Layer link training process is described. Additionally, in some embodiments, the host and peripheral device may implement a dynamically reversible TX/RX configuration to adapt to the read/write needs of the application relying on the host and the peripheral. A physical layer link training process is described that can adjust the number of TX or RX lanes as needed by the peripheral device or by the application(s) using the peripheral device.

Figure 7A:
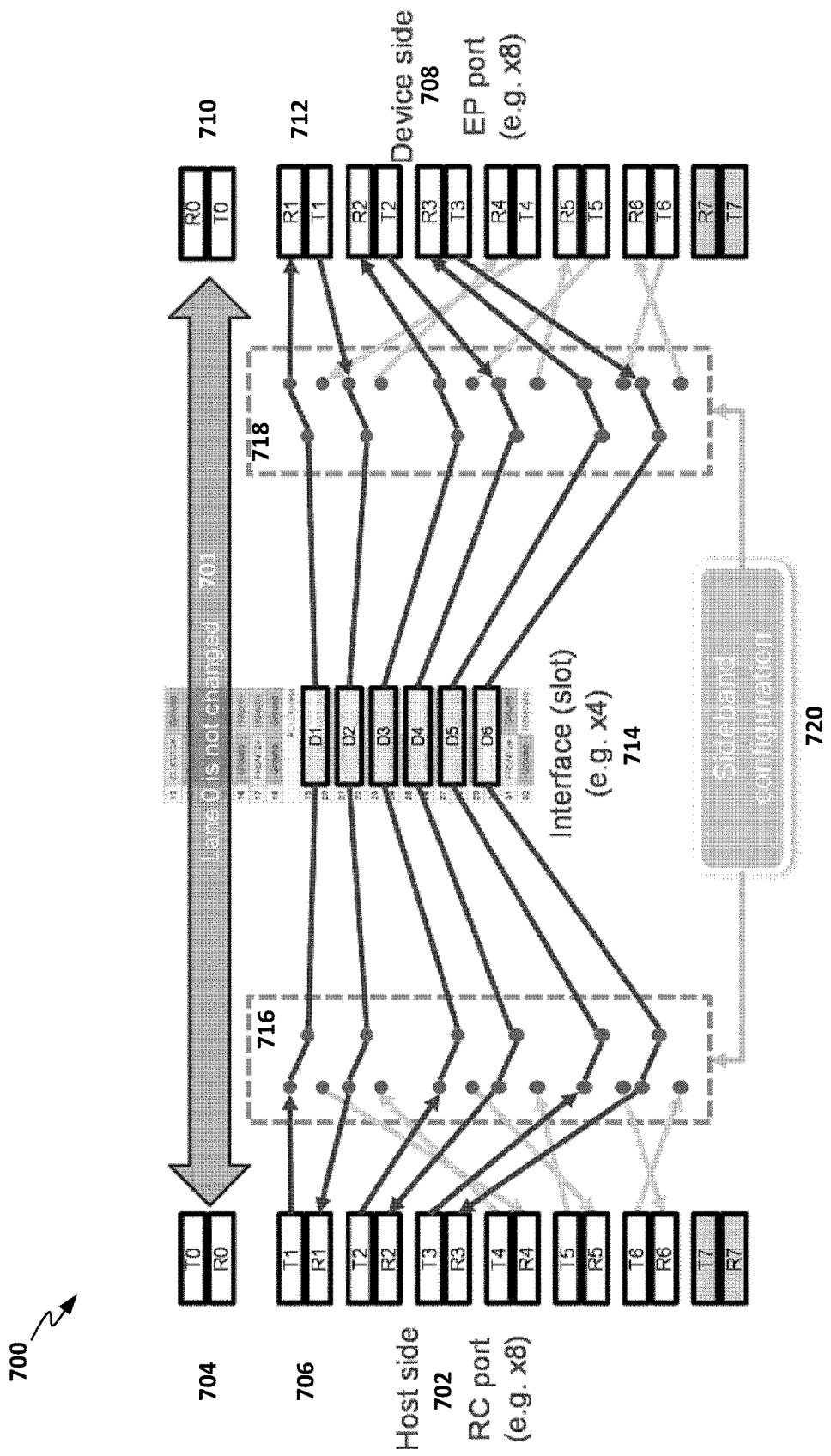
FIG. 7A is a schematic diagram of a host device connected to a peripheral device across a PCIe link in accordance with embodiments of the present disclosure.

FIG. 7A is a schematic diagram of a system 700 that includes a host device 702 connected to a peripheral device 708 across a PCIe-compliant interface 714 in accordance with embodiments of the present disclosure. At the outset, it is assumed that each link will contain at least one transmit (TX) lane and one receive (RX) lane (lane 0 701). The host side 702 can include a transmit and receive interface 704 to support lane 0 701. The host side 702 can also include a plurality of TX and RX interfaces 706. For example, for an x8 interface, the host can include 8 TX/RX pairs, as shown in FIG. 7A.

The device side 708 can include a transmit and receive interface 710 to support lane 0 701. The device side 708 can also include a plurality of TX and RX interfaces 712. For example, for an x8 interface, the device 708 can include 8 TX/RX pairs, as shown in FIG. 7A.

Figure 9:
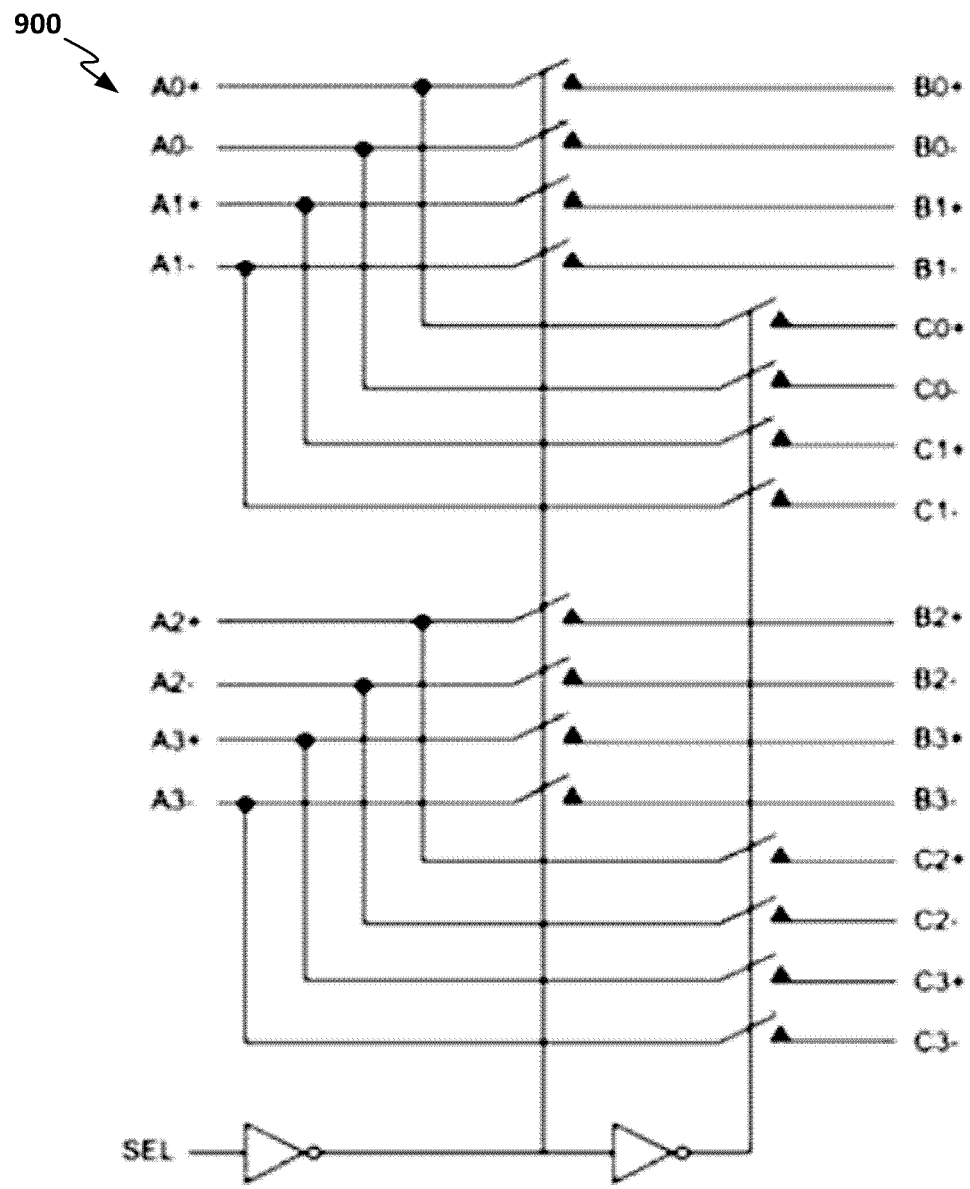
FIG. 9 is an example diagram of a 2:1 multiplexer in accordance with embodiments of the present disclosure.
Figure 10:
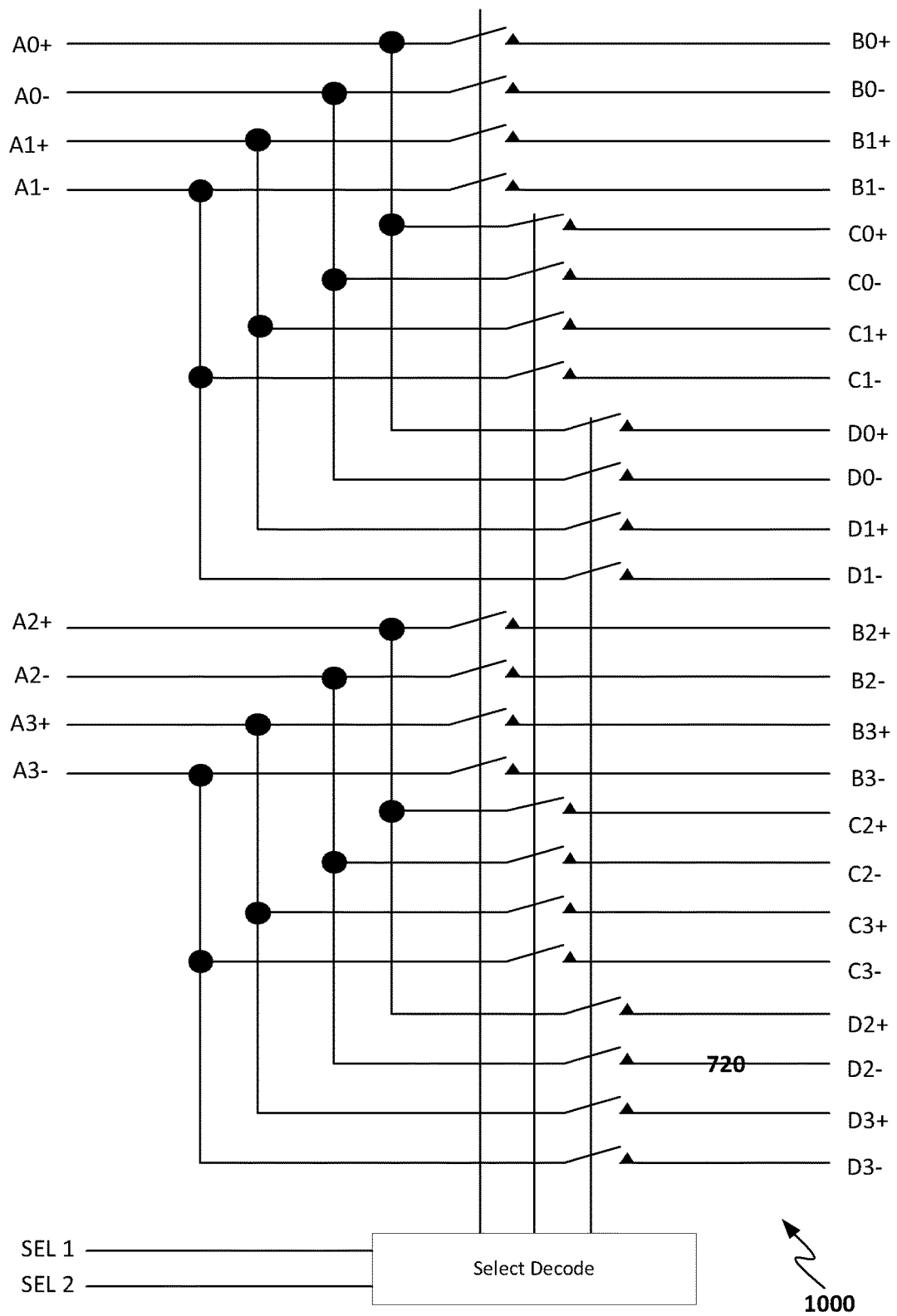
FIG. 10 is an example diagram of a 3:1 multiplexer in accordance with embodiments of the present disclosure.

A PCIe interface slot 714 can reside physically between the host side 702 and the device side 708. The PCIe interface slot 714 can link the host 702 and the device 708 via physical transmission lanes. In embodiments, the PCIe interface slot 714 can include an x4 interface. To accommodate the x4 PCIe interface 714, a pair of multiplexers can be used, as described below:

A multiplexer (MUX) component 716 can reside on the host side 702. The multiplexer can be any type of multiplexer to support the host-side interface and the PCIe interface 714. Example multiplexers are shown in FIGS. 9-10. The MUX 716 on host side 712 can multiplex signals from the host 702 such that the number of output lanes from MUX 716 can support the x4 interface 714. Likewise, a MUX 718 can reside on the device side 708.

The MUXs can be circuit elements, such as field programmable gate array (FPGA), or other suitable logic circuit element. The MUX can be controlled through a sideband configuration controller 720. The sideband configuration inputs are shown as the "SEL" pins in FIGS. 9-10. The sideband configuration controller 720 is a management entity that include logic circuitry to control the sideband SEL pin interfaces to configure the state of the MUX. The sideband controller 720 can be embodied by the CPU itself, or could be the platform baseboard management controller or an external management device.

Figure 7B:
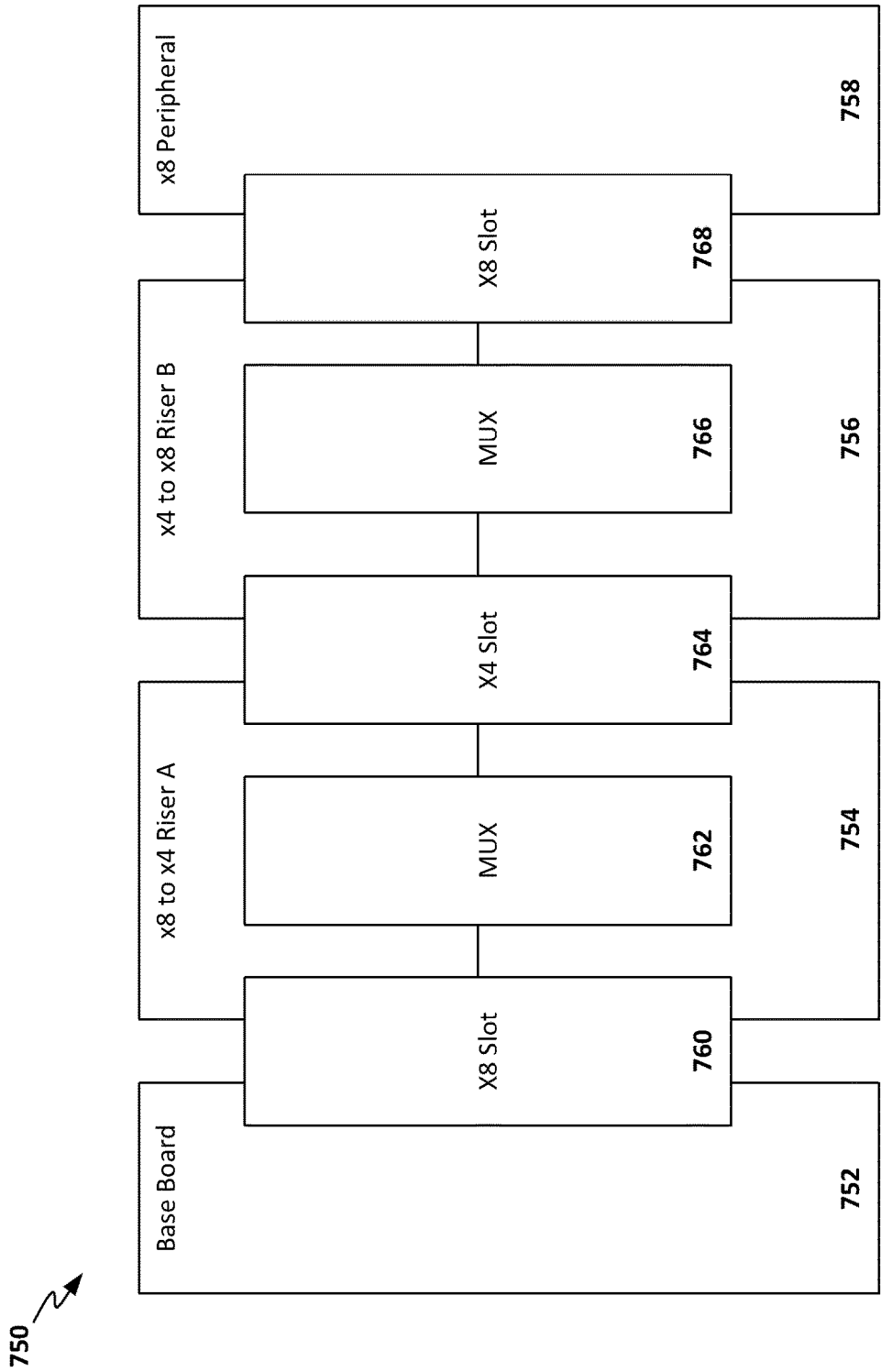
FIG. 7B is a schematic block diagram of a host device connected to a peripheral device across a PCIe link in accordance with embodiments of the present disclosure.

Turning to FIG. 7B, FIG. 7B is a schematic block diagram 750 of a host device connected to a peripheral device across a PCIe link in accordance with embodiments of the present disclosure. The diagram 750 illustrates Riser A 754 and Riser B 756. Riser A 754 can include a MUX 762 to support the x8 to x4 multiplexing. The multiplexer can be 3×2:1 MUX or can be 2×3:1 MUX, or other configuration of MUX. Depending on the application needs, the MUX type and numbers can be selected:

4T4R+2T6R: 2×2:1 mux can be used
    4T4R+1T7R: 3×2:1 mux can be used
    4T4R+1T7R+2T6R: 1×2:1 and 2×3:1 mux can be used
    4T4R+2T6R+6T2R: 1×2:1 and 3×3:1 mux can be used.

As an example, 3×2:1 mux in each riser 754 and 756 to implement a 4T4R→1T7R solution. By changing the mux setting a 1T7R solution can be achieved from a x8 Read performance through the x4 dense PCIe interface.

Figure 8:
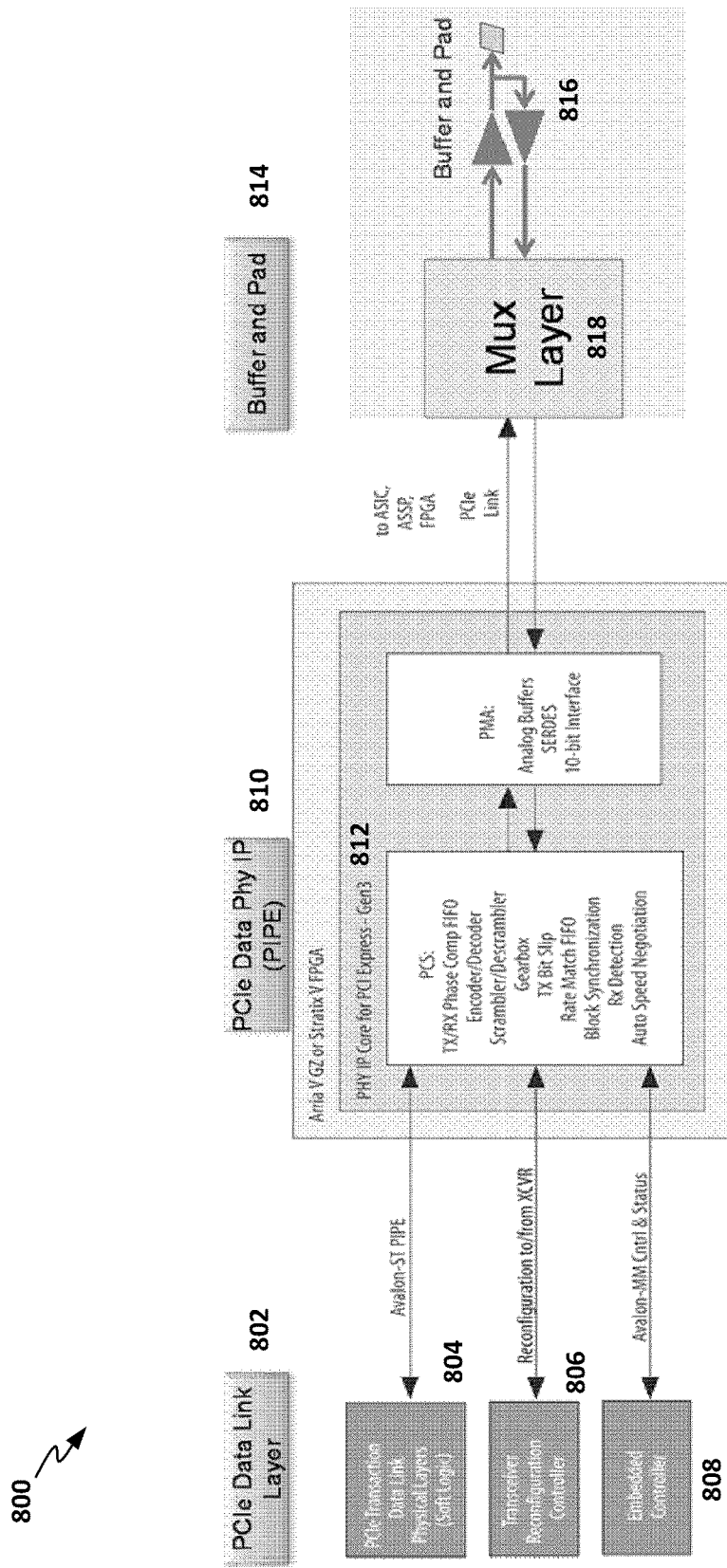
FIG. 8 is a schematic block diagram of PCIe layers in accordance with embodiments of the present disclosure.

FIG. 8 is a schematic block diagram of PCIe layers in accordance with embodiments of the present disclosure. This disclosure describes augmenting PCIe related aspects, as illustrated b FIG. 8. In general, FIG. 8 illustrates a PCIe data link layer 802, a PCIe Data Physical IP (PIPE) 810, and a buffer and pad 814.

The PCIe data link layer 802 includes an x8 controller to support x4 flexible design. In embodiments, other configurations can be used, such as configurations that can support x2, x6, x12, x16, and x32 PCIe lane widths. The x8 controller can include logic circuitry configured to support a symmetric x4 PCIe interface or an asymmetric 1T7R/2T6R/6T2R/7T1R PCIe interfaces and lane configurations.

The PCIe data link layer 802 also includes a transceiver reconfiguration controller 806. The transceiver reconfiguration controller can include added configurability to alter TX/RX ratios. The OS, Bios, or other system software component can, based on an application, alter the TX/RX ratios to suit the read or write heavy traffic.

The data link layer 802 includes field programmable gate array (FPGA) logic to implement an FPGA controller. Internal PCIe logic includes an extended PCIe configuration that supports link configurations, link control (i.e., to control muxes), and the second stage link training process described below.

The data link layer 802 also includes logic to partition/assemble link layer packet based on the available TX/RX physical lane count.

In the PIPE 804, logic is added for asymmetric lanes into the PHY IP Core 812. Specifically, a new "Asymmetric Lane Capability" definition is added within the PCI Express Extended Capabilities configuration registers to manage and configure asymmetric PCIe lanes (such as variable TX/RX support, support TX/RX ratio, link status, link control, TX/RX configuration, training, etc.). Additionally, the PIPE 810 includes logic to support different TX/RX lane count for analog buffers.

The buffer & pad 812 includes a bi-directional buffer 816. The bi directional buffer 819 includes a transmit buffer and a receive buffer together. The buffer & pad 814 includes a Mux Layer 818 to redirect TX or RX signals from PIPE 810 to the configurable different pair. Example implementations of MUX are shown in FIGS. 9 and 10, though are not limited to those implementations.

FIG. 9 is an example diagram of a 2:1 multiplexer in accordance with embodiments of the present disclosure. FIG. 10 is an example diagram of a 3:1 multiplexer in accordance with embodiments of the present disclosure. There are different implementation options for the Mux Layer, including but not limited to using a PCIe mux. If two to three TX/RX combinations are desired, multiple 2:1 mux 900 or 3:1 mux 1000 can be used (shown in FIGS. 9-10) to do so. There is an example in the paper to illustrate how to use the mux to implement the idea.

Figure 11A:
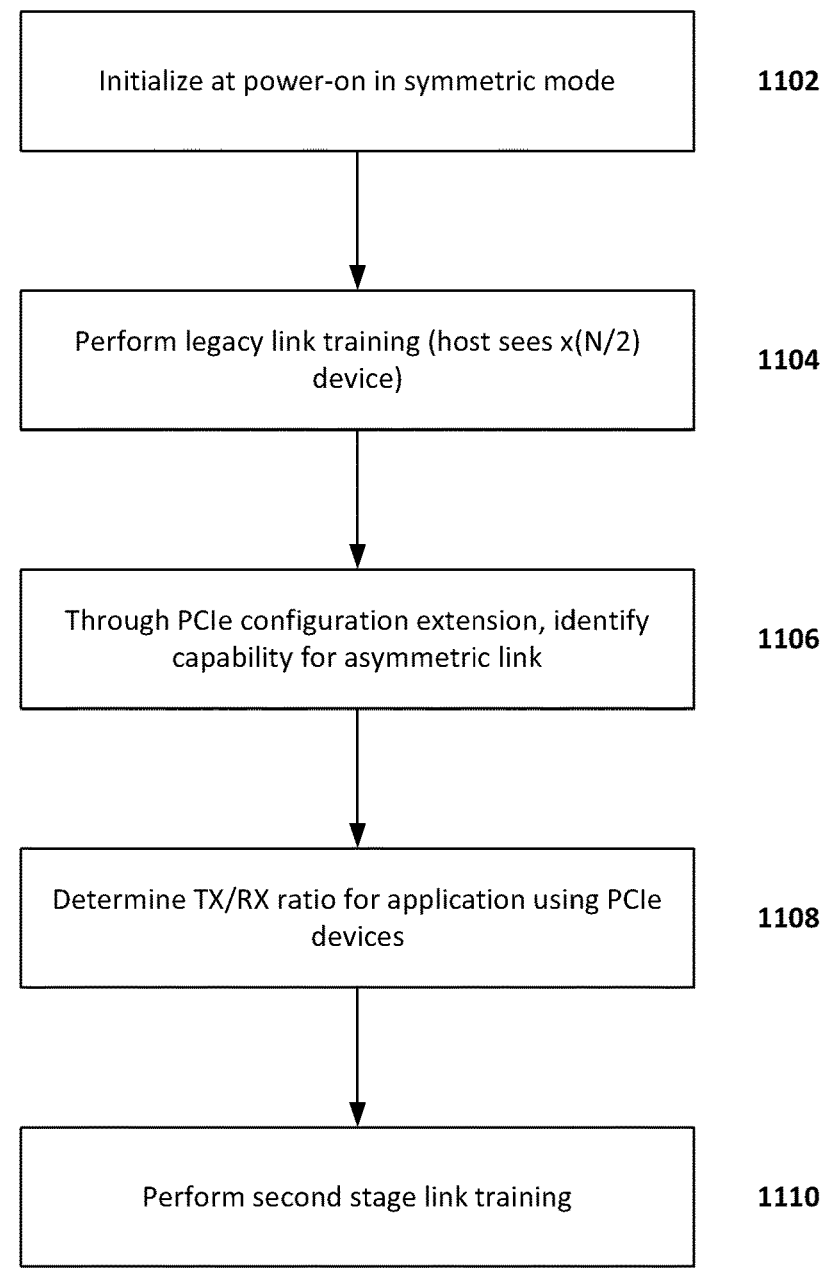

FIGS. 11A-B are a process flow diagrams for link training in accordance with embodiments of the present disclosure. FIG. 11A describes initialization steps 1100 for the physical layer link training process: First, upon power on, the device will set itself to symmetric mode (e.g. 4T4R) (1102). The system will undergo legacy link training in accordance with PCIe protocols (1104) so that the host would always see a x(N/2) device (e.g. x4 PCIe). The host software agent (e.g., BIOS, or OS, or device driver) can execute an initialization process that will identify the x(N/2) device actually has asymmetric link capability (e.g. through an extension to the PCI configuration space) (1106). The host or the device software agent can determine a read/write or TX/RX ratio for the application using the PCIe devices (1108). The host and device can perform the second stage link training (1110).

FIG. 11B describes the second stage link training (1110). The host sends command to device through Lane 0 to indicate how much Read/Write ratio the device should perform (1152). Both host and device sides will adjust the relevant settings (aforementioned), to ensure TX/RX are redirected to match the specific ratio (1154). One side (either the host or the device) transfers a data pattern to the other side through Lane 0, which was proven healthy in the first training phase described above (1156). In embodiments, the host side can resend the test data pattern to the other side through all the Lanes (1158). Then, the other side verifies if these two data patterns are received and match each other (1160).

In some embodiments, the device side can transmit a data pattern on lane 0, and the host side can transmit the data pattern back to the device side on one or more lanes to verify the linkage in both directions.

In some embodiments, the host or device side can initiate the transmission on lane 0 by transmitting a test pattern to the other side (device or host). The same side (whether host or device) can send the test pattern to the other side on all active transmit lanes. The other side (whether device or host) can send the received test pattern back on its active transmit lanes.

The loopback of the present disclosure can exercise all lanes in the same direction, as opposed to using only one pair of lanes for loopback testing. The loopback testing described herein can exercise all lanes in the same direction (e.g., simultaneously) and can discover potential lane to lane skew issues.

The host device can perform a loopback test to identify the number of available lanes. The loopback test can be performed after an initial training sequence (e.g., a legacy PCIe training sequence) and can cover all different TX/RX configurations.

The loopback test can include the following: The host root port can sends a compliance data pattern through TX lane 0 to the peripheral device (or devices), and device can send back the pattern using all available RX lanes. The host can verify the data pattern, and send a confirmation to device if the result is a pass.

After receiving pass from host, the device can send a compliance data pattern through RX lane 0 to host, and host can send back the pattern using all available TX lanes.

The device can verify the data pattern, and send confirmation to host if the result is a pass.

Figure 12:
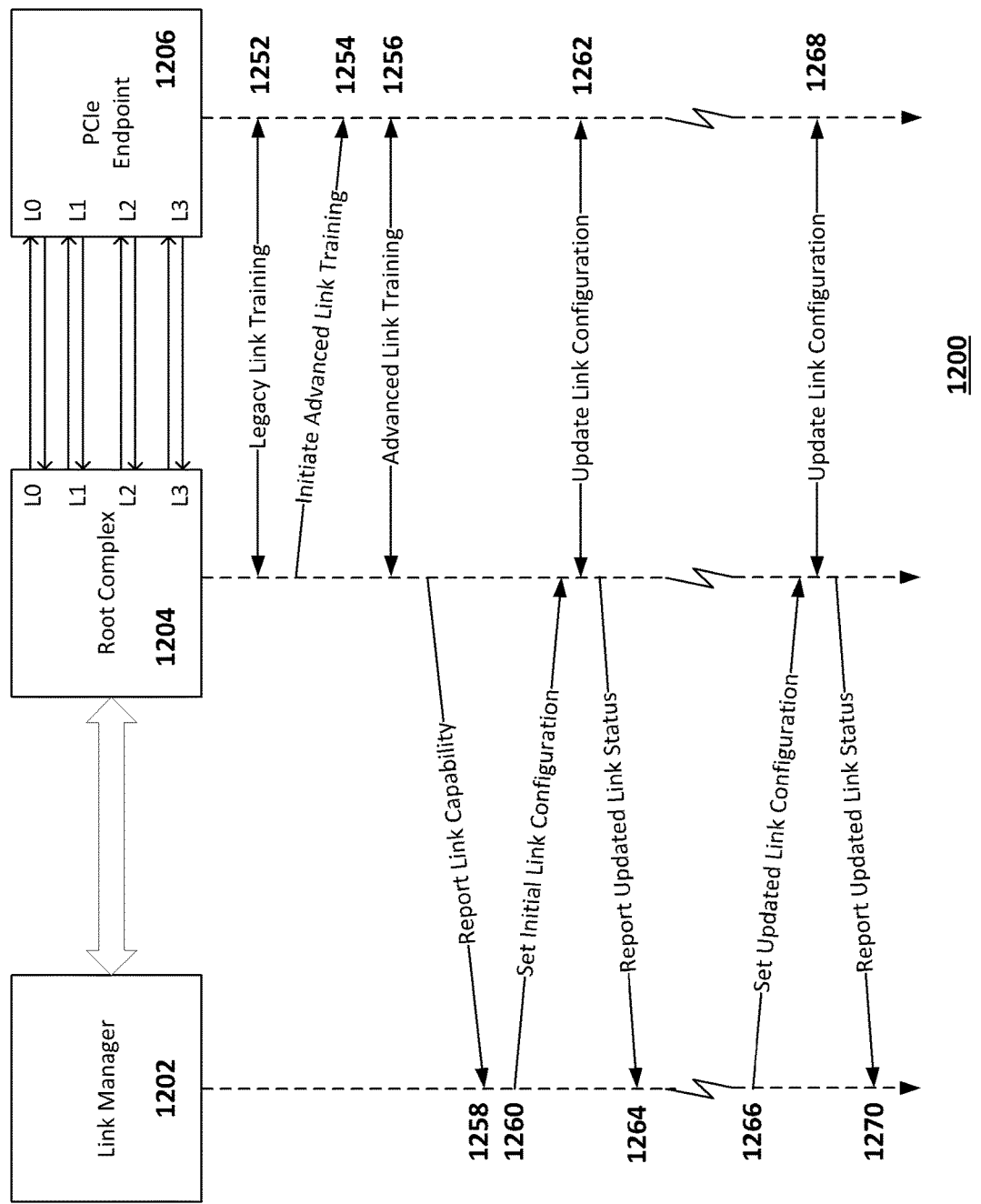
FIG. 12 is a schematic block diagram illustrating dynamically adjusting transmit and receive lanes in accordance with embodiments of the present disclosure.

FIG. 12 is a swim lane diagram for dynamically adjusting the transmit and receive lanes in accordance with embodiments of the present disclosure. FIG. 12 illustrates a system 1200 that includes a link manager 1202 and a root complex 1204 located at the host side, as asll as a PCIe endpoint device 1206. The root complex 1204 is in communication with PCIe endpoing 1206 via a plurality of lanes (L0, L1, L2, and L3).

The link manager 1202 is a logic entity that manages the PCIe configuration. Link manager 1202 can include firmware residing in a separate microcontroller, or driver running on the CPU with PCIe link. The link manager 1202 can communicate with the root complex 1204 (which can be part of the host device or CPU). The link manager 1202 maintains a table of supported link configurations reported by the root complex 1204 on the host device, as well as current link configurations (e.g., current link configurations can be updated periodically, and these updated link configurations can be stored with the link manager 1202). The root complex 1204 on the host device can identify supported link configurations based on the techniques described above.

At the outset, the root complex 1204 and the PCIe endpoint can perform legacy link training, as described above with FIG. 11A (1252). The root complex 1204 can initiate advanced link training (1254). The root complex 1204 and the PCIe endpoint 1206 can perform advanced link training as described in FIG. 11B (1256).

The root complex 1204 can provide a report of the link capability identified in the advanced link training (e.g., the link capability supported by the PCIe endpoint (1206), the root complex (1204), or both) (1258). The link manager 1202 can set the initial link configuration for the communication between the root complex 1204 and PCIe endpoing 1206 (1260). The link manager 1202 can provide the link configuration to the root complex logic 1204, which can set a MUX configuration to facilitate the lane configuration.

The root complex 1204 and the PCIe endpoint 1206 can perform additional updates to the lane configuration (1262). For example, the root complex 1204 and PCIe endpoint 1206 can perform additional link training to identify lane TX/RX ratios, depending on the application being run using the CPU and endpoint device. The root complex can report the updated link status to the link manager 1202 (1264). The link manager 1202 can then set the updated link configuration at the root complex 1204 (1266).

The root complex 1204 and the PCIe endpoint can continuously or periodically update the link configuration (1268) and the root complex 1204 can report the updated link status to the link manager 1202 (1270), and the cycle can continue.

Figure 13:
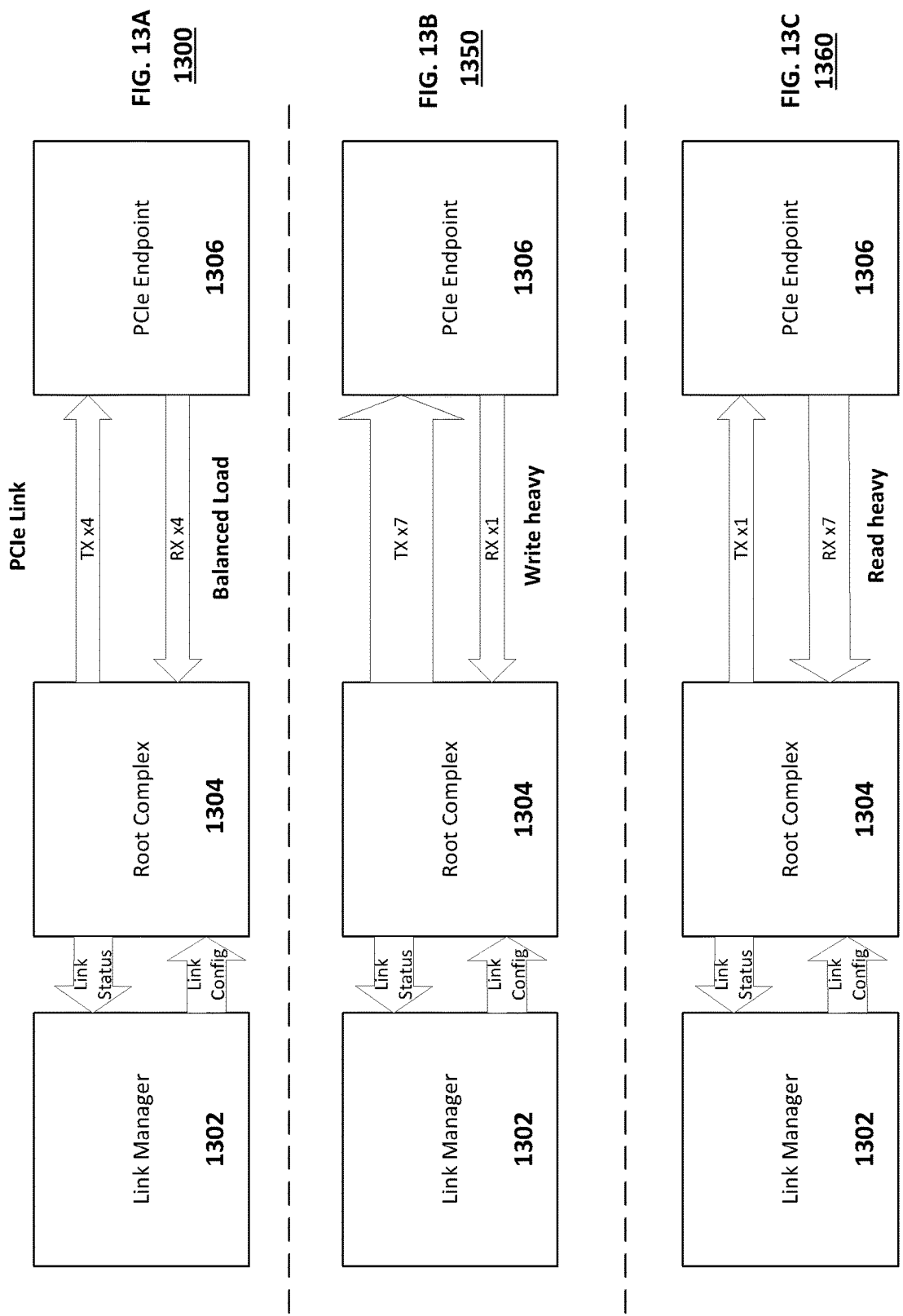
FIGS. 13A-C are swim lane diagrams for dynamically adjusting the transmit and receive lanes in accordance with embodiments of the present disclosure.

FIGS. 13A-C are schematic block diagrams illustrating dynamically adjusting transmit and receive lanes in accordance with embodiments of the present disclosure. The dynamic adjustment of TX and RX lanes involves the use of a link manager logic to dynamically configure the PCIe lane direction based on workload types. FIGS. 13A-C show three scenarios for adjusting the number of TX or RX lanes. FIG. 13A illustrates a balanced load 1300. The link manager 1302 can communicate with root complex 1304, which can communicate with the PCIe endpoint 1306 as described in FIG. 12. The number of transmission lanes (x4) is equal to the number of reception lanes (x4). FIG. 13B illustrates a write heavy scenario, where the number of TX lanes (here, x7 lanes for writing to the PCIe endpoint 1306) is larger than the number of read lanes (x1 read lanes, where the CPU root complex 1304 can read from the PCIe endpoing 1306).

FIG. 13C illustrates a read heavy scenario, where the number of RX lanes (here, x7 lanes for reading from the PCIe endpoint 1306) is larger than the number of write lanes (x1 write lanes, where the CPU root complex 1304 can write to the PCIe endpoing 1306).

Figure 14:
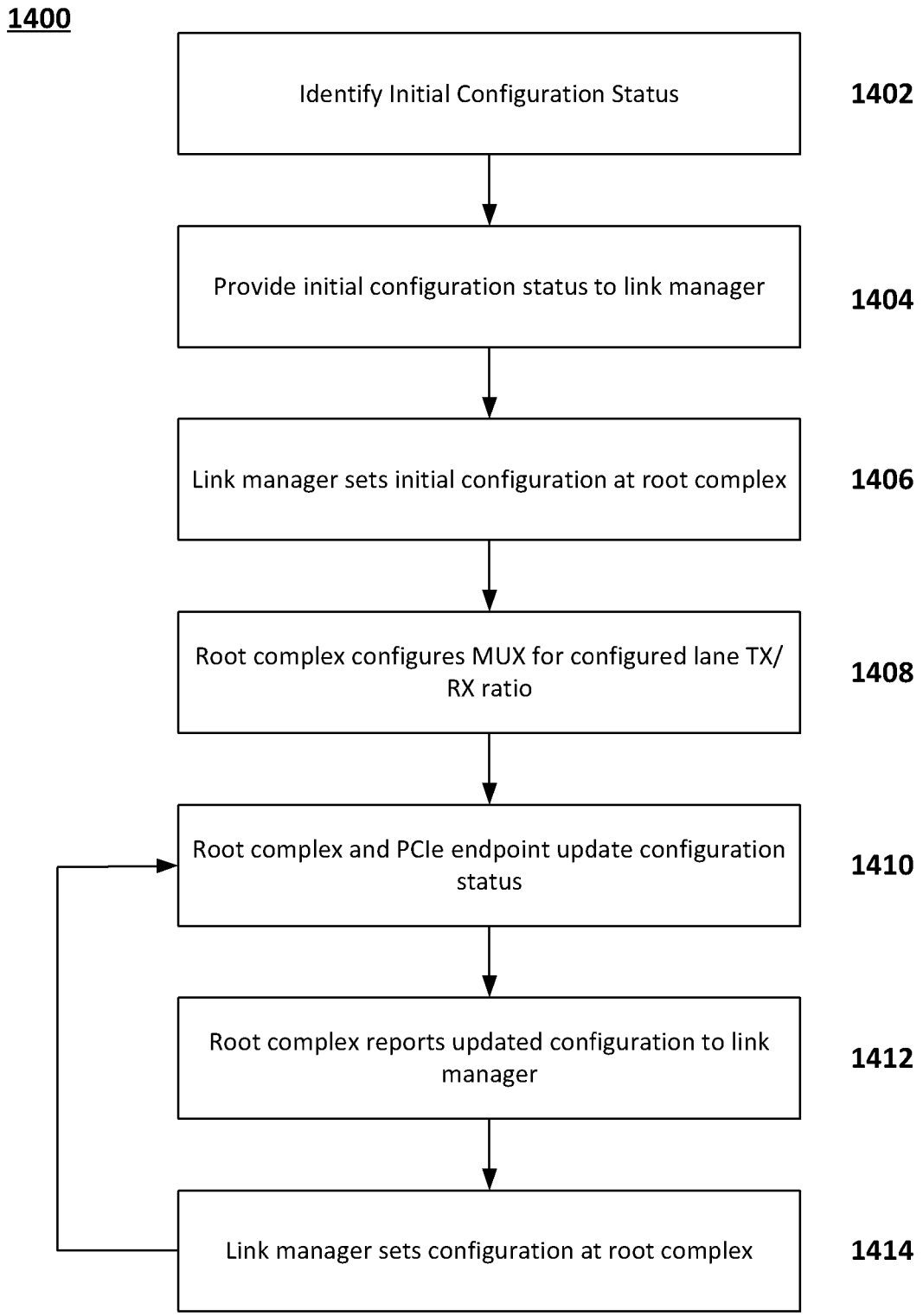
FIG. 14 is a process flow diagram for dynamically adjusting the transmit and receive lanes in accordance with embodiments of the present disclosure.

FIG. 14 is a process flow diagram for dynamically adjusting the transmit and receive lanes in accordance with embodiments of the present disclosure. At the outset, the root complex and PCIe device can identify an initial configuration status (1402). The initial configuration status can be identified based on the advanced link training techniques described above. The root complex can provide the initial configuration status to the link manager (1404). The link manager can set the initial configuration at the root complex (1406). The root complex can set the MUX to accommodate the configured TX/RX lane ratio (1408).

The root complex and the PCIe endpoint can update the configuration status (1410) (e.g., based on continued advanced link training techniques). The root complex can report the updated configuration status to the link manager (1412). The link manager can set the configuration at the root complex (1414). The process can continue at 1410 to periodically update the configuration status.

The procedure to dynamically update link configuration can be summarized by a two step process: stage 1: update to base link (x1 TX/RX) and stage 2: update to target link configuration. Two stages are used for reconfiguration of physical layer direction affects both hardware (i.e., change in MUX) and software settings (e.g., TX preemphasis and RX CTLE setting) on both the root complex and endpoint sides. An additional link health check can be done at step 2 to ensure the robustness of new link.

Stage 1: Upon receiving request from the Link Manager, the root complex (RC) will issue a command to the endpoint (EP) to initiate the link change procedure. The EP can confirm the request after finishing the pending transaction. EP will stop sending any further packet to RC. The RC will configure itself to x1 TX/RX, disable rest of TX links. The RC will issue a command to EP to request the link to be changed to x1 TX/RX. And the EP will configure itself to x1 TX/RX and then confirm the request.

Stage 2: The base link (TX/RX) can continue the normal transaction, and at the same time serve as command interface between the RC and the EP. The RC will issue a command to EP to request the new TX/RX configuration. The EP will configure the TX/RX settings, and then confirm the request to the RC. The RC will configure itself to target settings, and issue a command to the EP to start a test pattern. The EP will accept the request. The RC will send a test pattern over non-base TX links, and the EP will send the pattern back through base pair. RC will verify the pattern. This step can be skipped if there is no non-base TX pair.

The RC can issue a command to the EP to request a test pattern. The EP will send a test pattern through non-base RX pair. The RC will verify the pattern. This step can be skipped if there is no non-base RX pair. The EP will then issue a command to configure the link to target configuration.

Figure 15:
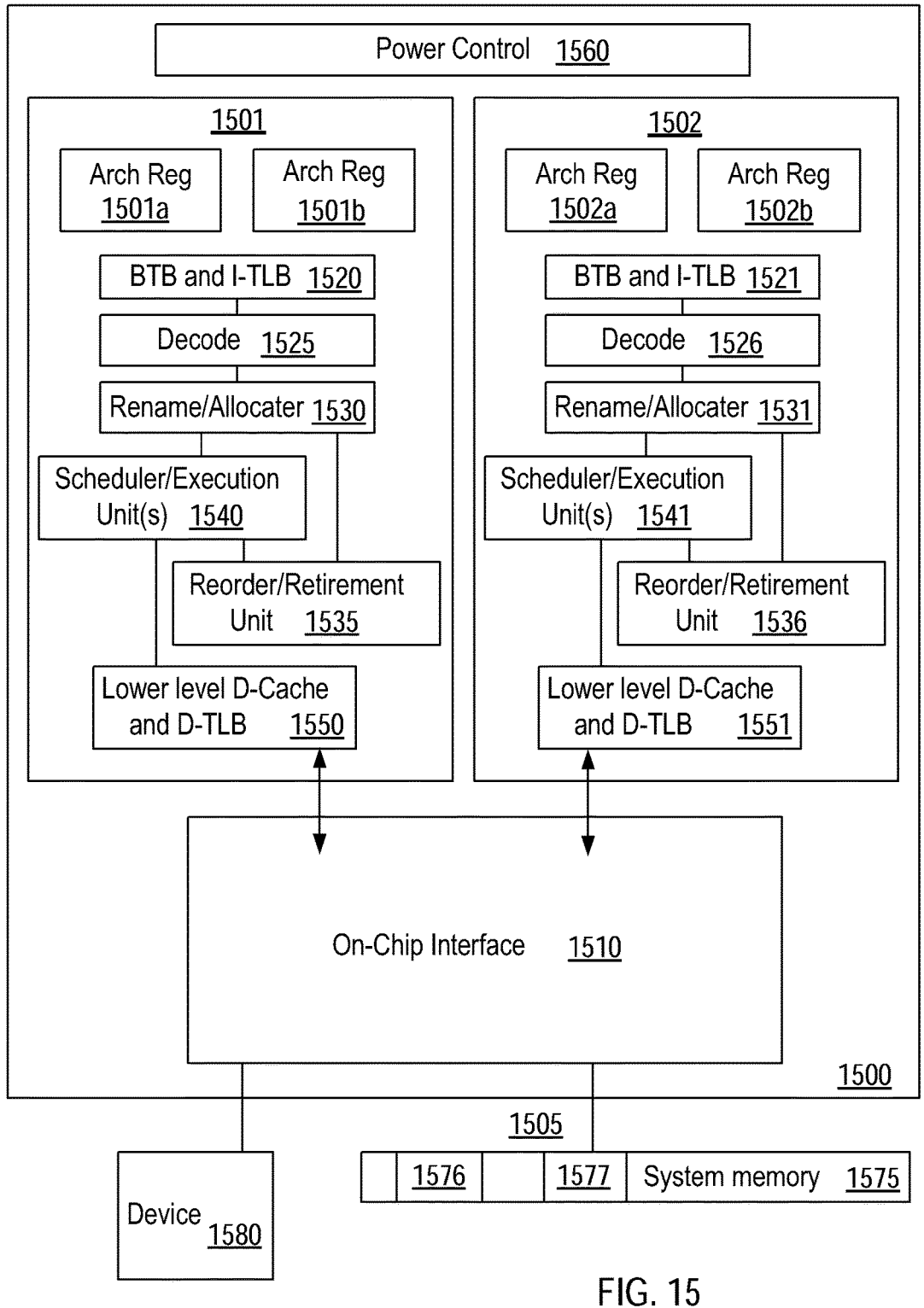
FIG. 15 illustrates an embodiment of a block diagram for a computing system including a multicore processor.

Referring to FIG. 15, an embodiment of a block diagram for a computing system including a multicore processor is depicted. Processor 1500 includes any processor or processing device, such as a microprocessor, an embedded processor, a digital signal processor (DSP), a network processor, a handheld processor, an application processor, a co-processor, a system on a chip (SOC), or other device to execute code. Processor 1500, in one embodiment, includes at least two cores—core 1501 and 1502, which may include asymmetric cores or symmetric cores (the illustrated embodiment). However, processor 1500 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources.

In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1500, as illustrated in FIG. 15, includes two cores—core 1501 and 1502. Here, core 1501 and 1502 are considered symmetric cores, i.e. cores with the same configurations, functional units, and/or logic. In another embodiment, core 1501 includes an out-of-order processor core, while core 1502 includes an in-order processor core. However, cores 1501 and 1502 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1501 are described in further detail below, as the units in core 1502 operate in a similar manner in the depicted embodiment.

As depicted, core 1501 includes two hardware threads 1501a and 1501b, which may also be referred to as hardware thread slots 1501a and 1501b. Therefore, software entities, such as an operating system, in one embodiment potentially view processor 1500 as four separate processors, i.e., four logical processors or processing elements capable of executing four software threads concurrently. As alluded to above, a first thread is associated with architecture state registers 1501a, a second thread is associated with architecture state registers 1501b, a third thread may be associated with architecture state registers 1502a, and a fourth thread may be associated with architecture state registers 1502b. Here, each of the architecture state registers (1501a, 1501b, 1502a, and 1502b) may be referred to as processing elements, thread slots, or thread units, as described above. As illustrated, architecture state registers 1501a are replicated in architecture state registers 1501b, so individual architecture states/contexts are capable of being stored for logical processor 1501a and logical processor 1501b. In core 1501, other smaller resources, such as instruction pointers and renaming logic in allocator and renamer block 1530 may also be replicated for threads 1501a and 1501b. Some resources, such as re-order buffers in reorder/retirement unit 1535, ILTB 1520, load/store buffers, and queues may be shared through partitioning. Other resources, such as general purpose internal registers, page-table base register(s), low-level data-cache and data-TLB 1515, execution unit(s) 1540, and portions of out-of-order unit 1535 are potentially fully shared.

Processor 1500 often includes other resources, which may be fully shared, shared through partitioning, or dedicated by/to processing elements. In FIG. 15, an embodiment of a purely exemplary processor with illustrative logical units/resources of a processor is illustrated. Note that a processor may include, or omit, any of these functional units, as well as include any other known functional units, logic, or firmware not depicted. As illustrated, core 1501 includes a simplified, representative out-of-order (OOO) processor core. But an in-order processor may be utilized in different embodiments. The OOO core includes a branch target buffer 1520 to predict branches to be executed/taken and an instruction-translation buffer (I-TLB) 1520 to store address translation entries for instructions.

Core 1501 further includes decode module 1525 coupled to fetch unit 1520 to decode fetched elements. Fetch logic, in one embodiment, includes individual sequencers associated with thread slots 1501a, 1501b, respectively. Usually core 1501 is associated with a first ISA, which defines/specifies instructions executable on processor 1500. Often machine code instructions that are part of the first ISA include a portion of the instruction (referred to as an opcode), which references/specifies an instruction or operation to be performed. Decode logic 1525 includes circuitry that recognizes these instructions from their opcodes and passes the decoded instructions on in the pipeline for processing as defined by the first ISA. For example, as discussed in more detail below decoders 1525, in one embodiment, include logic designed or adapted to recognize specific instructions, such as transactional instruction. As a result of the recognition by decoders 1525, the architecture or core 1501 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1526, in one embodiment, recognize the same ISA (or a subset thereof). Alternatively, in a heterogeneous core environment, decoders 1526 recognize a second ISA (either a subset of the first ISA or a distinct ISA).

In one example, allocator and renamer block 1530 includes an allocator to reserve resources, such as register files to store instruction processing results. However, threads 1501a and 1501b are potentially capable of out-of-order execution, where allocator and renamer block 1530 also reserves other resources, such as reorder buffers to track instruction results. Unit 1530 may also include a register renamer to rename program/instruction reference registers to other registers internal to processor 1500. Reorder/retirement unit 1535 includes components, such as the reorder buffers mentioned above, load buffers, and store buffers, to support out-of-order execution and later in-order retirement of instructions executed out-of-order.

Scheduler and execution unit(s) block 1540, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1550 are coupled to execution unit(s) 1540. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1501 and 1502 share access to higher-level or further-out cache, such as a second level cache associated with on-chip interface 1510. Note that higher-level or further-out refers to cache levels increasing or getting further way from the execution unit(s). In one embodiment, higher-level cache is a last-level data cache—last cache in the memory hierarchy on processor 1500—such as a second or third level data cache. However, higher level cache is not so limited, as it may be associated with or include an instruction cache. A trace cache—a type of instruction cache—instead may be coupled after decoder 1525 to store recently decoded traces. Here, an instruction potentially refers to a macro-instruction (i.e. a general instruction recognized by the decoders), which may decode into a number of micro-instructions (micro-operations).

In the depicted configuration, processor 1500 also includes on-chip interface module 1510. Historically, a memory controller, which is described in more detail below, has been included in a computing system external to processor 1500. In this scenario, on-chip interface 1510 is to communicate with devices external to processor 1500, such as system memory 1575, a chipset (often including a memory controller hub to connect to memory 1575 and an I/O controller hub to connect peripheral devices), a memory controller hub, a northbridge, or other integrated circuit. And in this scenario, bus 1505 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1575 may be dedicated to processor 1500 or shared with other devices in a system. Common examples of types of memory 1575 include DRAM, SRAM, non-volatile memory (NV memory), and other known storage devices. Note that device 1580 may include a communication module (e.g., hosting a communications processor), graphic accelerator, processor or card coupled to a memory controller hub, data storage coupled to an I/O controller hub, a wireless transceiver, a flash device, an audio controller, or other known device.

Recently however, as more logic and devices are being integrated on a single die, such as SOC, each of these devices may be incorporated on processor 1500. For example in one embodiment, a memory controller hub is on the same package and/or die with processor 1500. Here, a portion of the core (an on-core portion) 1510 includes one or more controller(s) for interfacing with other devices such as memory 1575 or other device 1580 (e.g., a communication modules). The configuration including an interconnect and controllers for interfacing with such devices is often referred to as an on-core (or un-core configuration). As an example, on-chip interface 1510 includes a ring interconnect for on-chip communication and a high-speed serial point-to-point link 1505 for off-chip communication. Yet, in the SOC environment, even more devices, such as the network interface, co-processors, memory 1575, graphics processor 1580, and any other known computer devices/interface may be integrated on a single die or integrated circuit to provide small form factor with high functionality and low power consumption.

In one embodiment, processor 1500 is capable of executing a compiler, optimization, and/or translator code 1577 to compile, translate, and/or optimize application code 1576 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 16:
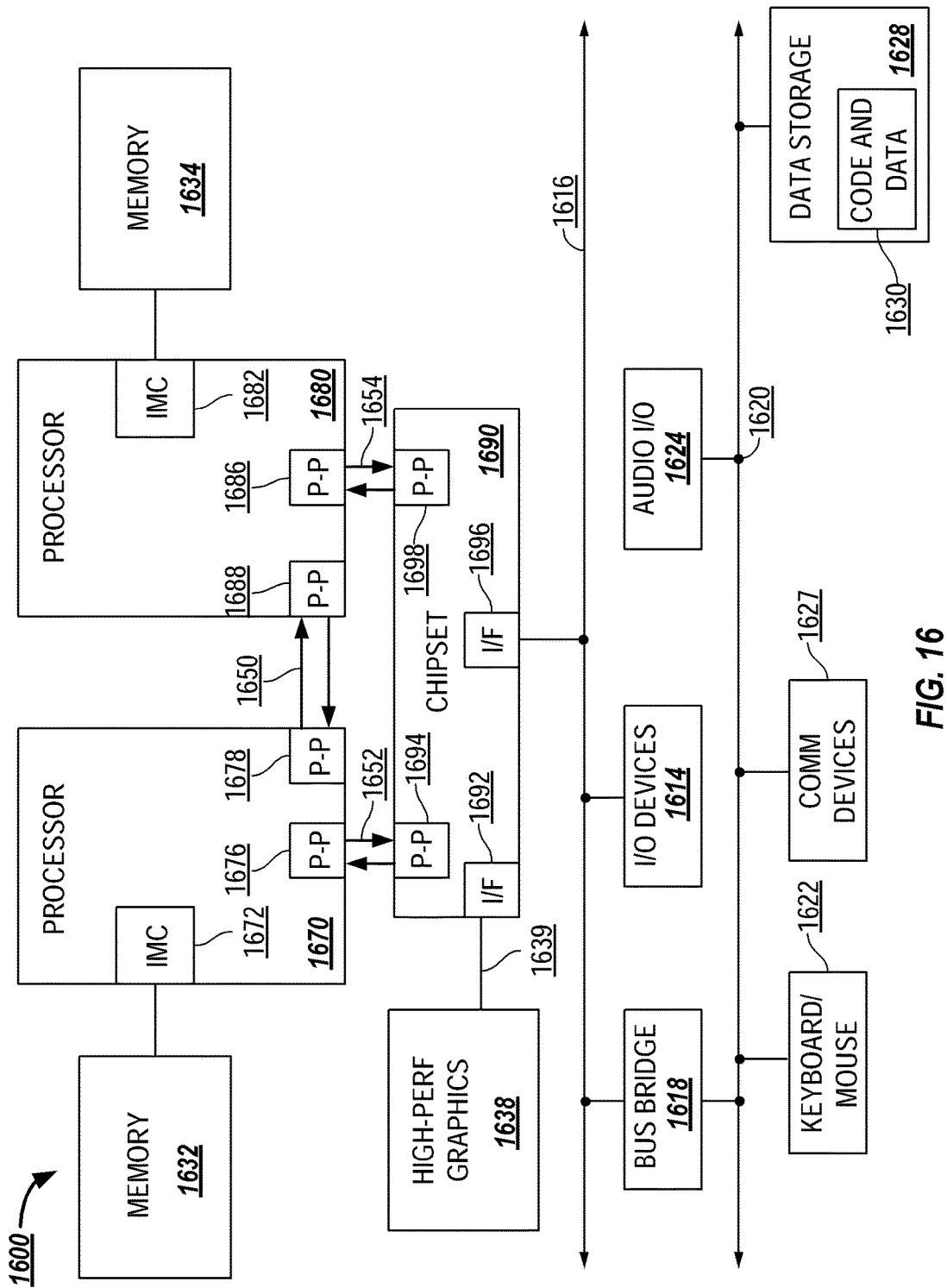
FIG. 16 illustrates an example system implemented as system on chip (SoC).

Turning next to FIG. 16, an embodiment of a system on-chip (SOC) design in accordance with the inventions is depicted. As a specific illustrative example, SOC 1600 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1600 has a processor 1605 (e.g., an application processor) including two or more cores (e.g., 1606 and 1607). Similar to the discussion above, cores 1606 and 1607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1606 and 1607 are coupled to cache control 1608 that is associated with bus interface unit 1609 and L2 cache 1611 to communicate with other parts of system 1600. Interconnect 1610 includes an on-chip interconnect, such as an IOSF, AMBA, or other interconnect discussed above, which potentially implements one or more aspects of described herein.

Interface 1610 provides communication channels to the other components, such as a Subscriber Identity Module (SIM) 1630 to interface with a SIM card, a boot rom 1635 to hold boot code for execution by cores 1606 and 1607 to initialize and boot SOC 1600, a SDRAM controller 1640 to interface with external memory (e.g. DRAM 1660), a flash controller 1645 to interface with non-volatile memory (e.g. Flash 1665), a peripheral control 1650 (e.g. Serial Peripheral Interface) to interface with peripherals, video codecs 1620 and Video interface 1625 to display and receive input (e.g. touch enabled input), GPU 1615 to perform graphics related computations, etc. Any of these interfaces may incorporate aspects of the invention described herein.

In addition, the system illustrates peripherals for communication, such as a Bluetooth module 1670, LTE modem 1675 (or other communications module (e.g., hosting a communications processor), GPS 1685, and WiFi 1685. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1610 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide a method, an apparatus, a system, a machine readable storage, a machine readable medium, hardware-and/or software-based logic in accordance with one or more of the examples embodiments below:

Example 1 is an apparatus comprising a hardware processor that includes logic circuitry to send a command signal to a device in communication with the hardware processor across a peripheral component interconnect express (PCIe) compliant link, the command signal indicating a transmission (TX) lane to receive (RX) lane ratio, and receive an indication that the device is capable of supporting asymmetric TX and RX ratios. Embodiments also include a multiplexer (MUX) circuit element; the hardware processor comprising logic circuitry to configure the MUX to direct communication signals from the hardware processor to the device based on the TX lane to RX lane ratio.

Example 2 may include the subject matter of example 1, wherein the hardware processor comprises logic circuitry to transmit a data pattern to the device through a first TX lane; and receive the data pattern through a plurality of RX lanes.

Example 3 may include the subject matter of examples 1 or 2, wherein the hardware processor comprises logic circuitry to receive a second data pattern through a first RX lane; and transmit the second data pattern through a plurality of TX lanes.

Example 4 may include the subject matter of any of examples 1 or 2 or 3, wherein the MUX comprises a plurality of 2:1 multiplexing logic circuitry.

Example 5 may include the subject matter of any of examples 1 or 2 or 3 or 4, wherein the MUX comprises a plurality of 3:1 multiplexing logic circuitry.

Example 6 may include the subject matter of any of examples 1 or 2 or 3 or 4 or 5, wherein the hardware processor comprises logic circuitry to receive an indication of a read and write ratio for an application running on the device and using the hardware processor.

Example 7 may include the subject matter of any of examples 1 or 2 or 3 or 4 or 5 or 7, and also include a bidirectional buffer, the bidirectional buffer comprising a first buffer for buffering communication signals for transmission from the hardware processor to the device and a second buffer for buffering communication signals for reception from the device to the hardware processor.

Example 8 may include the subject matter of any of examples 1 or 2 or 3 or 4 or 5 or 6 or 7, wherein the PCIe compliant link comprises an x4 slot interconnecting the hardware processor and the device.

Example 9 may include the subject matter of any of examples 1 or 2 or 3 or 4 or 5 or 6 or 7 or 8, wherein the hardware logic circuitry comprises an x8 controller logic circuitry to control the MUX.

Example 10 may include the subject matter of any of examples 1 or 2 or 3 or 4 or 5 or 6 or 7 or 8 or 9, 10, and may also include a PCIe data link layer interface, the PCIe data link layer interface comprising logic circuitry to configure a physical layer for asymmetric TX and RX lane configurations and comprising logic circuitry to interpret signals from the physical layer that is configured for asymmetric TX lanes and RX lanes.

Example 11 is a system that includes a host processor; and a peripheral device; wherein the host processor is coupled to the peripheral device by a peripheral component interconnect express (PCIe) compliant link; the peripheral device comprising logic circuitry to identify, based on an application using the device and the host processor, a read to write ratio utilized by the application; and provide the read to write ratio to the host processor. The host processor comprising logic circuitry to send a command signal to a device in communication with the hardware processor across a peripheral component interconnect express (PCIe) compliant link, the command signal indicating a transmission (TX) lane to receive (RX) lane ratio, the TX lane to RX lane ratio corresponding to the read to write ratio identified by the peripheral device; and receive an indication that the device is capable of supporting asymmetric TX and RX ratios.

Example 12 may include the subject matter of example 11, and also include a multiplexer (MUX) circuit element; the hardware processor comprising logic circuitry to configure the MUX to direct communication signals from the hardware processor to the device based on the TX lane to RX lane ratio.

Example 13 may include the subject matter of any of examples 11 or 12, wherein the hardware processor comprises logic circuitry to transmit a data pattern to the device through a first TX lane; and receive the data pattern through a plurality of RX lanes.

Example 14 may include the subject matter of examples 11 or 12 or 13, wherein the hardware processor comprises logic circuitry to receive a second data pattern through a first RX lane; and transmit the second data pattern through a plurality of TX lanes.

Example 15 may include the subject matter of example 12, wherein the MUX comprises a plurality of 2:1 multiplexing logic circuitry.

Example 16 may include the subject matter of example 12, wherein the MUX comprises a plurality of 3:1 multiplexing logic circuitry.

Example 17 may include the subject matter of any of examples 11 or 12 or 13 or 14 or 15 or 16, wherein the hardware processor comprises logic circuitry to receive an indication of a read and write ratio for an application running on the device and using the hardware processor.

Example 18 may include the subject matter of any of examples 11 or 12 or 13 or 14 or 15 or 16 or 17, and may also include comprising a bidirectional buffer, the bidirectional buffer comprising a first buffer for buffering communication signals for transmission from the hardware processor to the device and a second buffer for buffering communication signals for reception from the device to the hardware processor.

Example 19 may include the subject matter of any of examples 11 or 12 or 13 or 14 or 15 or 16 or 17 or 18, wherein the PCIe compliant link comprises an x4 slot interconnecting the hardware processor and the device.

Example 20 may include the subject matter of example 12, wherein the hardware logic circuitry comprises an x8 controller logic circuitry to control the MUX.

Example 21 may include the subject matter of any of examples 1-10, wherein the hardware processor comprises logic circuitry to transmit a data to the device through a first TX lane; and receive data through a plurality of RX lanes.

Example 22 may include the subject matter of any of examples 1-10 and 21, wherein the hardware processor comprises logic circuitry to receive data through a first RX lane; and transmit data through a plurality of TX lanes.

Example 23 may include the subject matter of any of examples 1-7, wherein PCIe compliant link comprises one of an x4 slot, an x12 slot, an x16 slot, or an x32 slot interconnecting the hardware processor and the device.

Example 24 may include the subject matter of example 23, wherein the hardware logic circuitry comprises an x8 controller logic circuit, an x24 controller, an x32 controller, or an x64 controller, to control the MUX.

Example 25 is a method comprising transmitting a command signal to a device in communication with the hardware processor across a peripheral component interconnect express (PCIe) compliant link, the command signal indicating a transmission (TX) lane to receive (RX) lane ratio, receiving an indication that the device is capable of supporting asymmetric TX and RX ratios; transmitting a data pattern to the device through a first TX lane; receiving the data pattern through a plurality of RX lanes; receiving a second data pattern through a first RX lane; and transmitting the second data pattern through a plurality of TX lanes.

Example 26 may include the subject matter of example 25, and may also include transmitting data to the device through a first TX lane; and receiving data through a plurality of RX lanes.

Example 27 may include the subject matter of any of examples 25 or 26, and may also include receiving data through a first RX lane; and transmitting data through a plurality of TX lanes.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a hardware processor comprising logic circuitry to:
      send a command signal to a device in communication with the hardware processor across a Peripheral Component Interconnect Express (PCIe) compliant link, the command signal indicating a transmission (TX) lane to receive (RX) lane ratio, and
      receive an indication that the device is capable of supporting asymmetric TX and RX ratios; and
   a multiplexer (MUX) circuit element;
   the hardware processor comprising logic circuitry to configure the MUX to direct communication signals from the hardware processor to the device based on the TX lane to RX lane ratio;
   wherein the hardware processor comprises logic circuitry to:
      transmit a data pattern to the device through a first TX lane;
      receive the data pattern through a plurality of RX lanes;
      receive a second data pattern through a first RX lane; and
      transmit the second data pattern through a plurality of TX lanes.

2. The apparatus of claim 1, wherein the MUX comprises a plurality of 2:1 multiplexing logic circuitry.

3. The apparatus of claim 1, wherein the MUX comprises a plurality of 3:1 multiplexing logic circuitry.

4. The apparatus of claim 1, wherein the hardware processor comprises logic circuitry to:
   receive an indication of a read and write ratio for an application running on the device and using the hardware processor.

5. The apparatus of claim 1, further comprising a bidirectional buffer, the bidirectional buffer comprising a first buffer for buffering communication signals for transmission from the hardware processor to the device and a second buffer for buffering communication signals for reception from the device to the hardware processor.

6. The apparatus of claim 1, PCIe compliant link comprises an x4 slot interconnecting the hardware processor and the device.

7. The apparatus of claim 1, wherein the hardware logic circuitry comprises an x8 controller logic circuitry to control the MUX.

8. The apparatus of claim 1, further comprising a PCIe data link layer interface, the PCIe data link layer interface comprising logic circuitry to configure a physical layer for asymmetric TX and RX lane configurations and comprising logic circuitry to interpret signals from the physical layer that is configured for asymmetric TX lanes and RX lanes.

9. A system comprising:
a host processor; and
a peripheral device;
wherein the host processor is coupled to the peripheral device by a Peripheral Component Interconnect Express (PCIe) compliant link;
the peripheral device comprising logic circuitry to:
identify, based on an application using the device and the host processor, a read to write ratio utilized by the application; and
provide the read to write ratio to the host processor; and
the host processor comprising logic circuitry to:
send a command signal to a device in communication with the hardware processor across a peripheral component interconnect express (PCIe) compliant link, the command signal indicating a transmission (TX) lane to receive (RX) lane ratio, the TX lane to RX lane ratio corresponding to the read to write ratio identified by the peripheral device; and
receive an indication that the device is capable of supporting asymmetric TX and RX ratios;
wherein the hardware processor comprises logic circuitry to:
transmit a first data pattern to the device through a first TX lane; and
receive the first data pattern through a plurality of RX lanes.

10. The system of claim 9, further comprising a multiplexer (MUX) circuit element; the hardware processor comprising logic circuitry to configure the MUX to direct communication signals from the hardware processor to the device based on the TX lane to RX lane ratio.

11. The system of claim 10, wherein the MUX comprises a plurality of 2:1 multiplexing logic circuitry.

12. The system of claim 10, wherein the MUX comprises a plurality of 3:1 multiplexing logic circuitry.

13. The system of claim 9, wherein the hardware processor comprises logic circuitry to:
receive a second data pattern through a first RX lane; and
transmit the second data pattern through a plurality of TX lanes.

14. The system of claim 9, wherein the hardware processor comprises logic circuitry to:
receive an indication of a read and write ratio for an application running on the device and using the hardware processor.

15. The system of claim 9, further comprising a bidirectional buffer, the bidirectional buffer comprising a first buffer for buffering communication signals for transmission from the hardware processor to the device and a second buffer for buffering communication signals for reception from the device to the hardware processor.

16. The system of claim 9, wherein the PCIe compliant link comprises an x4 slot interconnecting the hardware processor and the device.

17. The system of claim 10, wherein the hardware logic circuitry comprises an x8 controller logic circuitry to control the MUX.

18. The system of claim 9, wherein the hardware processor comprises logic circuitry to:
transmit a data to the device through a first TX lane; and
receive data through a plurality of RX lanes.

19. The system of claim 9, wherein the hardware processor comprises logic circuitry to:
receive data through a first RX lane; and
transmit data through a plurality of TX lanes.

20. The system of claim 9, wherein the PCIe compliant link comprises one of an x4 slot, an x12 slot, an x16 slot, or an x32 slot interconnecting the hardware processor and the device.

21. The system of claim 9, wherein the hardware logic circuitry comprises an x8 controller logic to control the MUX.

22. A method comprising:
transmitting a command signal to a device in communication with the hardware processor across a Peripheral Component Interconnect Express (PCIe) compliant link, the command signal indicating a transmission (TX) lane to receive (RX) lane ratio,
receiving an indication that the device is capable of supporting asymmetric TX and RX ratios;
transmitting a data pattern to the device through a first TX lane;
receiving the data pattern through a plurality of RX lanes;
receiving a second data pattern through a first RX lane; and
transmitting the second data pattern through a plurality of TX lanes.

* * * * *